(12) United States Patent
Yasukochi et al.

(10) Patent No.: US 8,113,813 B2
(45) Date of Patent: Feb. 14, 2012

(54) OPTICAL SHAPING APPARATUS AND SHAPING BASE

(75) Inventors: Hiroyuki Yasukochi, Kanagawa (JP); Nobuhiro Kihara, Kanagawa (JP); Junichi Kuzusako, Saitama (JP); Masato Nakakura, Saitama (JP)

(73) Assignee: Sony Corporation, Tokyo (JP)

( * ) Notice: Subject to any disclaimer, the term of this patent is extended or adjusted under 35 U.S.C. 154(b) by 10 days.

(21) Appl. No.: 12/693,617

(22) Filed: Jan. 26, 2010

(65) Prior Publication Data

US 2010/0196526 A1    Aug. 5, 2010

(30) Foreign Application Priority Data

Feb. 3, 2009 (JP) ............................... P2009-023104

(51) Int. Cl.
*B29B 13/08* (2006.01)
(52) U.S. Cl. ................. 425/174.4; 425/436 R; 425/470; 248/638
(58) Field of Classification Search ............... 425/174.4, 425/385, 470, 436 R, 436 RM; 248/176.1, 248/346.03, 560, 638
See application file for complete search history.

(56) References Cited

U.S. PATENT DOCUMENTS

| | | | | |
|---|---|---|---|---|
| 4,402,483 A | * | 9/1983 | Kurabayashi et al. | 248/636 |
| 4,617,081 A | * | 10/1986 | Bleau et al. | 156/443 |
| 4,908,216 A | * | 3/1990 | Dullings et al. | 425/3 |
| 4,988,069 A | * | 1/1991 | D'Silva | 248/605 |
| 5,529,473 A | * | 6/1996 | Lawton et al. | 425/174.4 |
| 5,770,123 A | * | 6/1998 | Hatakeyama et al. | 264/1.21 |
| 5,876,550 A | * | 3/1999 | Feygin et al. | 156/264 |
| 6,027,324 A | * | 2/2000 | Hull | 425/174.4 |
| 6,419,203 B1 | * | 7/2002 | Dang | 248/585 |
| 6,824,714 B1 | * | 11/2004 | Turck et al. | 264/40.1 |
| 7,165,498 B2 | * | 1/2007 | Mackrill et al. | 108/20 |
| 7,318,718 B2 | * | 1/2008 | Ueno | 425/174.4 |
| 7,384,253 B2 | * | 6/2008 | Berg et al. | 425/127 |
| 7,429,172 B2 | * | 9/2008 | Chotard | 425/521 |
| 7,448,862 B2 | * | 11/2008 | Kokubo et al. | 425/174.4 |
| 7,520,740 B2 | * | 4/2009 | Wahlstrom et al. | 425/186 |
| 7,766,288 B2 | * | 8/2010 | Kim et al. | 248/176.1 |
| 2001/0030384 A1 | * | 10/2001 | Baker et al. | 264/318 |
| 2006/0198917 A1 | * | 9/2006 | Ho et al. | 425/174.4 |
| 2008/0230677 A1 | * | 9/2008 | De Hoon | 248/638 |

(Continued)

FOREIGN PATENT DOCUMENTS

| | | | | |
|---|---|---|---|---|
| JP | 02107843 | A | * | 4/1990 |
| JP | 10277790 | A | * | 10/1998 |
| JP | 2000043150 | A | * | 2/2000 |

(Continued)

*Primary Examiner* — Joseph Del Sole
*Assistant Examiner* — Dimple Bodawala
(74) *Attorney, Agent, or Firm* — K&L Gates LLP

(57) ABSTRACT

An optical shaping apparatus includes a light transmissive member, a shaping base, and a movement mechanism. The light transmissive member includes a regulation surface to regulate a liquid level of a photo-curable resin, and causes light used for curing the photo-curable resin to pass therethrough. The shaping base includes a support surface, a first end portion, and a second end portion, the support surface being opposed to the regulation surface and supporting a three-dimensionally shaped object that is formed by laminating the photo-curable resins cured by the light in a stepwise manner, the second end portion being on an opposite side of the first end portion. The movement mechanism moves the shaping base in a direction away from the light transmissive member so that the support surface is gradually moved away from the regulation surface from the first end portion side to the second end portion side.

4 Claims, 8 Drawing Sheets

U.S. PATENT DOCUMENTS

| | | | |
|---|---|---|---|
| 2009/0123590 A1* | 5/2009 | Komoriya et al. | 425/174.4 |
| 2009/0130449 A1* | 5/2009 | El-Siblani | 428/409 |
| 2009/0184444 A1* | 7/2009 | Honda et al. | 264/401 |
| 2010/0166906 A1* | 7/2010 | Hashimoto et al. | 425/385 |
| 2010/0239889 A1* | 9/2010 | Uchida et al. | 428/826 |
| 2010/0303947 A1* | 12/2010 | Mori et al. | 425/385 |

FOREIGN PATENT DOCUMENTS

| | | |
|---|---|---|
| JP | 2007-90619 | 4/2007 |
| JP | 2007090619 A * | 4/2007 |
| WO | WO 8912778 A1 * | 12/1989 |
| WO | WO 2008142784 A1 * | 11/2008 |

* cited by examiner

OPTICAL SHAPING APPARATUS AND SHAPING BASE

CROSS REFERENCES TO RELATED APPLICATIONS

The present application claims priority to Japanese Priority Patent Application JP 2009-023104 filed in the Japan Patent Office on Feb. 3, 2009, the entire content of which is hereby incorporated by reference.

BACKGROUND

The present application relates to an optical shaping apparatus for forming a cured layer by irradiating light to a photo-curable resin and forming a three-dimensionally shaped object of a desired shape by laminating the cured layers, and a shaping base that is used in the optical shaping apparatus and supports a three-dimensionally shaped object.

Heretofore, an optical shaping apparatus for forming a shaped object of a desired shape by using three-dimensional CAD (Computer Aided Design) data has been widely known.

As optical shaping methods used for the optical shaping apparatus, a free liquid level method and a regulated liquid level method are known in general.

Japanese Patent Application Laid-open No. 2007-90619 (paragraphs [0004] to [0006], FIGS. 4 and 5; hereinafter, referred to as Patent Document 1) discloses an optical shaping apparatus using the free liquid level method. In the optical shaping apparatus, a photo-curable resin is injected in a resin container, and a table (shaping base) is placed nearly below a liquid level of the photo-curable resin. Light is irradiated from above the liquid level (free liquid level) of an uncured resin above the table, and thus a first cured layer is formed on the table. Next, the table is lowered, light is irradiated again from above the liquid level of the uncured resin, and a second cured layer is formed on the first cured layer. By repeating those operations, a three-dimensional model (three-dimensionally shaped object) is formed on the table.

In the case where the free liquid level method is used, since the liquid level of the photo-curable resin is open to the atmosphere, the liquid level fluctuates when the table is lowered, for example. Therefore, there arises a problem that it may be difficult to form a three-dimensionally shaped object with high accuracy. For that reason, in the optical shaping apparatus disclosed in Patent Document 1, a squeegee is moved on the liquid level to uniform the liquid level of the photo-curable resin.

As described above, the fluctuation of the liquid level becomes a problem in the free liquid level method. In this regard, there may be a case where the regulated liquid level method of regulating the liquid level of the photo-curable resin is used.

Japanese Patent Application Laid-open No. 2000-043150 (paragraph [0007], FIG. 12; hereinafter, referred to as Patent Document 2) discloses an optical shaping apparatus using the regulated liquid level method. In the optical shaping apparatus, a photo-curable resin is injected in a resin container including a transmissive member such as a glass plate at a bottom surface thereof, and a stage (shaping base) is placed in the vicinity of the transmissive member. Light used for curing the photo-curable resin is irradiated from below the transmissive member. By the light, an uncured resin between the transmissive member and the stage is cured and thus a first cured layer is formed. After the first cured layer is formed, the stage is elevated to form a second cured layer. By repeating those operations, a three-dimensional object (three-dimensionally shaped object) is formed.

SUMMARY

However, in the case where the regulated liquid level method is used, there is a problem that the cured layer formed by curing the photo-curable resin by light adheres to the transmissive member such as a glass plate. As a result, there arises a problem that when the shaping base is elevated, the cured layer (three-dimensionally shaped object) is damaged on a boundary surface between the transmissive member and the cured layer, which hinders formation of a highly accurate three-dimensionally shaped object.

In view of the circumstances as described above, there is a need for an optical shaping apparatus capable of forming a highly accurate three-dimensionally shaped object, and a shaping base used in the optical shaping apparatus.

According to an embodiment of the present application, there is provided an optical shaping apparatus including a light transmissive member, a shaping base, and a movement mechanism.

The light transmissive member includes a regulation surface and causes light used for curing a photo-curable resin to pass therethrough.

The regulation surface regulates a liquid level of the photo-curable resin.

The shaping base includes a support surface, a first end portion, and a second end portion.

The support surface is opposed to the regulation surface and supports a three-dimensionally shaped object that is formed by laminating the photo-curable resins cured by the light in a stepwise manner.

The second end portion is an end portion on an opposite side of the first end portion.

The movement mechanism moves the shaping base in a direction away from the light transmissive member so that the support surface is gradually moved away from the regulation surface from the first end portion side to the second end portion side.

In the embodiment of the present application, when the shaping base is moved in the direction away from the light transmissive member, the support surface is gradually moved away from the regulation surface from the first end portion side to the second end portion side. In this case, on a boundary surface between the regulation surface and the cured layer (three-dimensionally shaped object), a force is applied to the cured layer in an oblique direction with respect to the regulation surface. Accordingly, the cured layer that adheres to the regulation surface can be separated from the regulation surface smoothly. As a result, the cured layer can be prevented from being damaged and a highly accurate three-dimensionally shaped object can be formed.

In the optical shaping apparatus, the shaping base may include a first member, a second member, and an elastic member.

The first member is coupled to the movement mechanism.

The second member includes the support surface and is rotatably coupled to the first member on the first end portion side.

The elastic member couples the first member and the second member on the second end portion side.

In the embodiment of the present application, the second member including the support surface is rotatably coupled to the first member coupled to the movement mechanism on the first end portion side, and on the second end portion side via the elastic member. With this structure, when the shaping base is moved in the direction away from the light transmissive member, the support surface is gradually separated from the regulation surface from the first end portion side to the second end portion side. Accordingly, the cured layer that adheres to the regulation surface can be separated from the regulation surface smoothly.

Further, when the cured layer is separated from the regulation surface, the first member and the second member can be attracted to each other by contraction of the elastic member. Accordingly, when the photo-curable resin is cured, the support surface can be kept parallel to the regulation surface, for example.

In the optical shaping apparatus, the elastic member may attract the first member and the second member by a force larger than a force by which the support surface is attracted to the regulation surface side due to contraction caused when the photo-curable resin is cured.

In the embodiment of the present application, it is possible to prevent the support surface from being attracted to the regulation surface side due to the contraction caused when the photo-curable resin is cured. Accordingly, a three-dimensionally shaped object with higher accuracy can be formed.

The optical shaping apparatus may further include a lock mechanism to fix the first member and the second member in a state where the first member and the second member are attracted to each other.

In the embodiment of the present application, it is possible to prevent the support surface from being attracted to the regulation surface side due to the contraction caused when the photo-curable resin is cured. Accordingly, a three-dimensionally shaped object with higher accuracy can be formed.

In the optical shaping apparatus, the shaping base may further include a resin layer formed into a thin film on the support surface.

Accordingly, it is possible to prevent the cured layer (three-dimensionally shaped object) from being separated from the support surface side.

According to another embodiment of the present application, there is provided a shaping base including a first member, a second member, and an elastic member.

The first member includes a first end portion and a second end portion opposite to the first end portion.

The second member includes a support surface and is rotatably coupled to the first member on the first end portion side.

The support surface supports a three-dimensionally shaped object formed by laminating photo-curable resins cured by light in a stepwise manner.

The elastic member couples the first member and the second member on the second end portion side.

As described above, according to the embodiments of the present application, it is possible to provide an optical shaping apparatus capable of forming a highly accurate three-dimensionally shaped object, and a shaping base used in the optical shaping apparatus.

Additional features and advantages are described herein, and will be apparent from the following Detailed Description and the figures.

DETAILED DESCRIPTION

Hereinafter, embodiments of the present application will be described with reference to the drawings.

First Embodiment

Overall Structure of Optical Shaping Apparatus and Structure of Shaping Base

Figure 1:
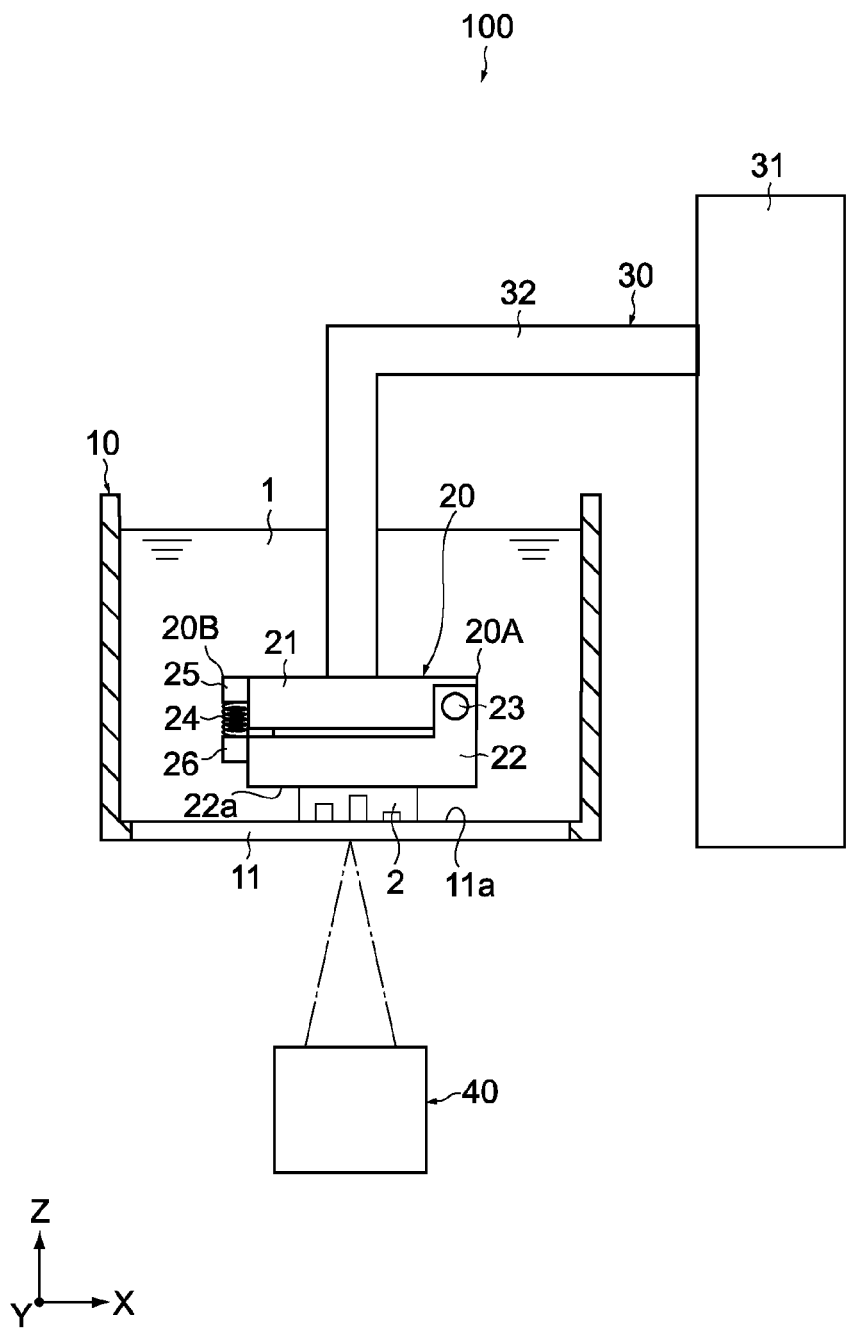
FIG. 1 is a schematic diagram showing an overall structure of an optical shaping apparatus according to an embodiment of the present application.
Figure 2:
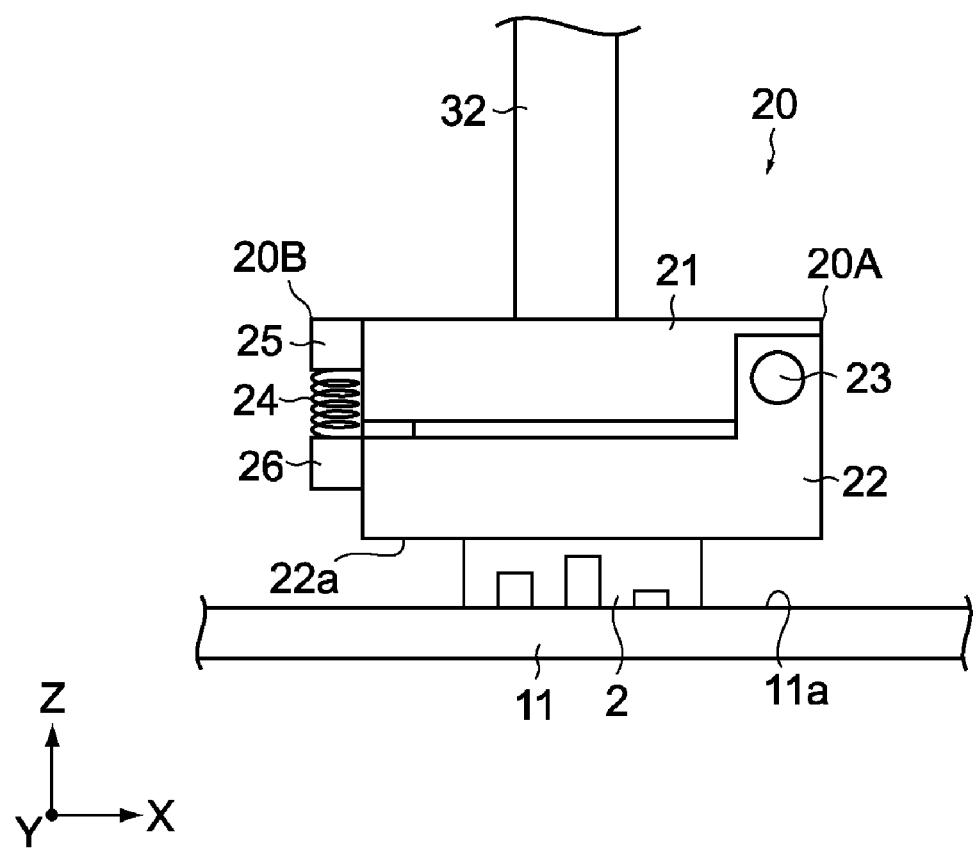
FIG. 2 is an enlarged diagram of a shaping base included in the optical shaping apparatus.

FIG. 1 is a schematic diagram showing an overall structure of an optical shaping apparatus according to a first embodiment of the present application. FIG. 2 is an enlarged diagram of a shaping base included in the optical shaping apparatus. It should be noted that in the figures explained herein, each size of the optical shaping apparatus and components included therein may be changed from the actual size thereof for easy understanding.

As shown in those figures, an optical shaping apparatus 100 includes a container 10 for accommodating a liquid photo-curable resin 1, and a shaping base 20 that is immersed in the liquid photo-curable resin 1 within the container 10 and supports a three-dimensionally shaped object 2. The optical shaping apparatus 100 further includes a movement mechanism 30 for moving the shaping base 20 within the container 10 and an optical system 40 for irradiating light that cures the liquid photo-curable resin 1 to the liquid photo-curable resin 1.

The container 10 includes, at a bottom portion thereof, a light transmissive plate 11 for causing light irradiated from the optical system 40 to pass therethrough. The light transmissive plate 11 regulates a liquid level of the photo-curable resin 1 (liquid level to which light from the optical system 40 is irradiated) on an upper surface 11a of the light transmissive plate 11. Herein, the upper surface 11a of the light transmissive plate 11 is referred to as a regulation surface 11a.

The light transmissive plate 11 is formed of, for example, glass or a light transmissive resin. However, any material may be used as long as it can pass through light from the optical system 40.

As the photo-curable resin 1 accommodated in the container 10, an epoxy-based UV curable resin, an urethane-based UV curable resin, and the like are used. However, the photo-curable resin 1 may be a visible light curable resin and a material of the liquid photo-curable resin 1 is not particularly limited.

The shaping base 20 includes a reference plate 21 (first member) and a shaping plate 22 (second member) that is provided below the reference plate 21 and supported by the reference plate 21. The shaping base 20 further includes a hinge member 23 that roratably supports the reference plate 21 and the shaping plate 22 on a first end portion 20A side of the shaping base 20 (right-hand side in FIGS. 1 and 2). Furthermore, the shaping base 20 includes a spring member 24 for coupling the reference plate 21 and the shaping plate 22 on a second end portion 20B side of the shaping base 20 (left-hand side in FIGS. 1 and 2).

The reference plate 21 is provided with the hinge member 23 on the first end portion 20A side and includes a spring support portion 25 that supports the spring member 24 on the second end portion 20B side. The reference plate 21 is coupled to an arm portion 32 of the movement mechanism 30 at an upper portion of the reference plate 21. With this structure, the shaping base 20 is movable within the container 10 by the movement mechanism 30.

The shaping plate 22 is bent substantially at a right angle at a portion on the first end portion 20A side and is provided with the hinge member 23 at the bent portion. Further, the shaping plate 22 includes a spring support portion 26 that supports the spring member 24 on the second end portion 20B side.

A bottom surface 22a of the shaping plate 22 functions as a support surface 22a for supporting a three-dimensionally shaped object 2 that is formed by laminating the photo-curable resins cured by light irradiated from the optical system 40 (cured layers) in a stepwise manner.

The reference plate 21 and the shaping plate 22 are made of metal or a resin, for example, but a material thereof is not particularly limited.

The spring member 24 is coupled to the spring support portion 25 of the reference plate 21 at one end portion, and to the spring support portion 26 of the shaping plate 22 at the other end portion. The spring member 24 attracts the reference plate 21 and the shaping plate 22 by a predetermined force. The force by which the spring member 24 attracts the reference plate 21 and the shaping plate 22 is set to be larger than a force with which the photo-curable resin 1 contracts when the photo-curable resin 1 is cured on the regulation surface 11a.

When the photo-curable resin 1 is irradiated with light from the optical system 40 to thereby form a cured layer, the photo-curable resin 1 contracts and thus the shaping plate 22 is attracted downwardly (on regulation surface 11a side). For that reason, the force by which the spring member 24 attracts the reference plate 21 and the shaping plate 22 is set to be larger than the force caused when the photo-curable resin 1 contracts. Accordingly, it is possible to prevent the shaping plate 22 from being moved downwardly when the photo-curable resin 1 contracts, with the result that a three-dimensionally shaped object 2 with high accuracy can be formed.

It should be noted that instead of the spring member 24, another elastic member such as rubber may be used.

The movement mechanism 30 includes a movement mechanism main body 31 and the arm portion 32 that is provided to the movement mechanism main body 31 and coupled to the upper portion of the reference plate 21. The movement mechanism main body 31 moves, via the arm portion 32, the shaping base 20 in a vertical direction (z-axis direction) and horizontal directions (x- and y-axis directions) within the container 10. It should be noted that a control portion such as a CPU (Central Processing Unit) (not shown) controls the movement of the shaping base 20 by the movement mechanism 30.

The optical system 40 irradiates light to the liquid photo-curable resin 1 located on the regulation surface 11a from below via the light transmissive plate 11, to thereby cure the photo-curable resin 1.

(Structure of Optical System)

Figure 3:
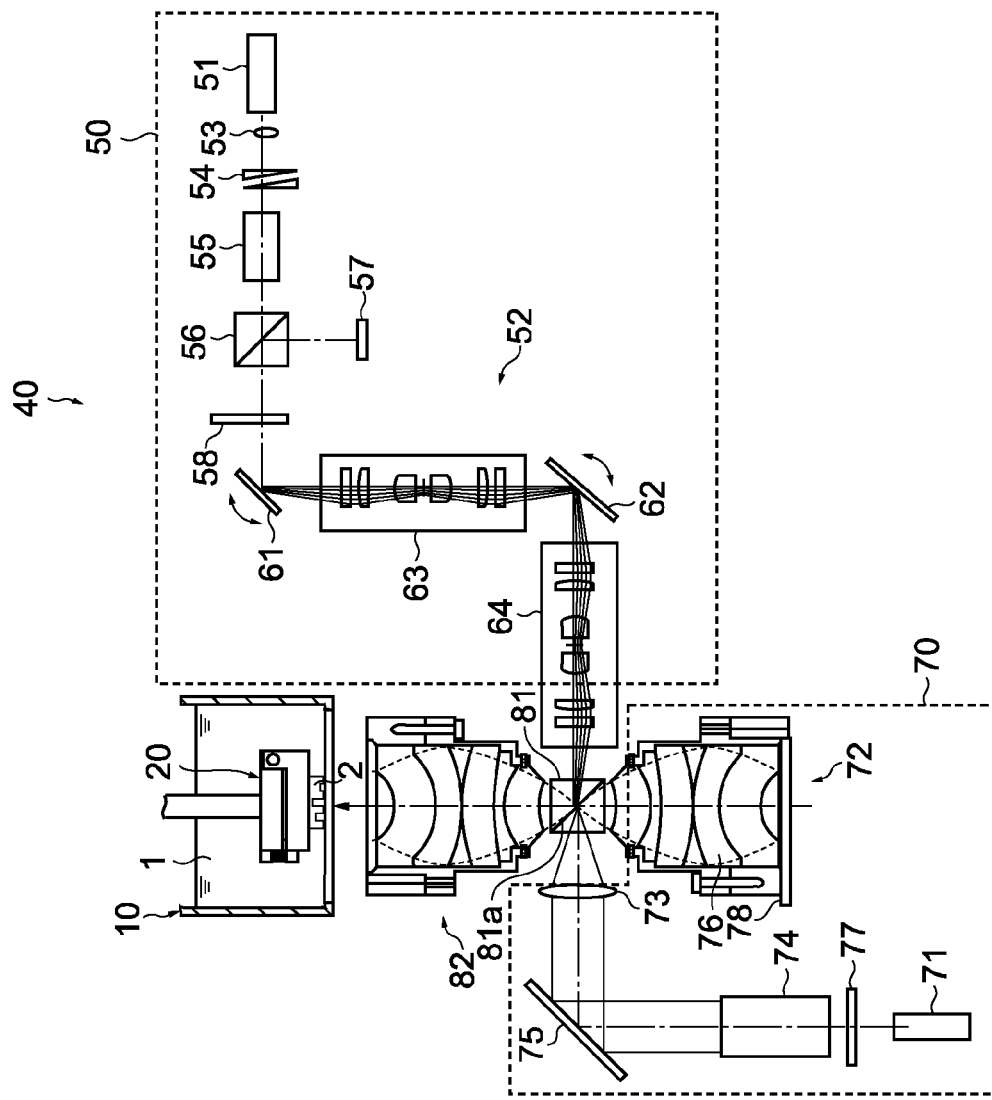
FIG. 3 is a diagram showing a structure of an optical system.

FIG. 3 is a diagram showing a structure of the optical system 40.

As shown in FIG. 3, the optical system 40 includes a beam scanning optical system 50 and a collective exposure optical system 70. The beam scanning optical system 50 scans light onto the photo-curable resin 1 located on the regulation surface 11a. The collective exposure optical system 70 collectively irradiates light onto the photo-curable resin 1 for each predetermined area. Further, the optical system 40 includes a beam splitter 81 for combining an optical path of the beam scanning optical system 50 and an optical path of the collective exposure optical system 70.

First, the beam scanning optical system 50 will be described.

The beam scanning optical system 50 includes a first light source 51, a scanning section 52, a collimator lens 53, an anomorphic lens 54, a beam expander 55, a beam splitter 56, a reflected-light detection section 57, and a shutter 58.

For the first light source 51, a semiconductor laser that radiates a laser beam having a relatively short wavelength approximately in a blue to ultraviolet region is used, for example. The first light source 51 is not limited to the semiconductor laser, and a gas laser may be used.

The collimator lens 53 converts a divergence angle of a light beam radiated from the first light source 51 to obtain substantially parallel light. The anomorphic lens 54 shapes the light beam of a substantially oval shape that has been emitted from the collimator lens 53 to have a substantially circular shape. The beam expander 55 converts a beam diameter of the light beam that has been emitted from the anomorphic lens 54 into a desired beam diameter that is appropriate for an aperture, NA (Numerical Aperture), and the like of an objective lens 82 described later.

The shutter 58 controls pass and shielding of the light beam irradiated to the photo-curable resin 1. Specifically, the shutter 58 controls on/off of drawing by the beam scanning optical system 50.

The beam splitter 56 causes the light beam radiated from the first light source 51 to pass therethrough and also guides reflected light reflected by the photo-curable resin 1 to the reflected-light detection section 57.

The reflected-light detection section 57 detects reflected light that is reflected by the photo-curable resin 1 and then reflected by the beam splitter 56 via optical components. The optical shaping apparatus 100 can execute a focus correction by detecting the reflected light by the reflected-light detection section 57. As a method of detecting a focus correction signal by the reflected-light detection section 57, methods using astigmatism, triangulation, and the like are used, for example.

Further, by the reflected-light detection section 57 described above, the optical shaping apparatus 100 can detect whether the photo-curable resin 1 at a position scanned with the light beam is any of an uncured portion or a cured portion. The photo-curable resin 1 has property of changing reflectance when cured. Accordingly, this relationship is used.

The scanning section 52 includes a first galvanometer mirror 61 and a second galvanometer mirror 62. The scanning section 52 further includes a first relay lens 63 that is arranged between the first galvanometer mirror 61 and the second galvanometer mirror 62, and a second relay lens 64 that is arranged between the second galvanometer mirror 62 and the beam splitter 81. Moreover, the scanning section 52 includes the objective lens 82 that is arranged between the beam splitter 81 and the light transmissive plate 11.

Each of the first galvanometer mirror 61 and the second galvanometer mirror 62 includes a reflection section such as a mirror that is rotatable in a predetermined direction and an adjustment section such as a motor that adjusts an angle of the rotation direction of the reflection section in accordance with an electric signal.

The first galvanometer mirror 61 deflects the light beam incident from the beam expander 55 by the reflection section and the adjustment section, and scans the light beam in the x-axis direction on a plane parallel to the regulation surface 11a. The second galvanometer mirror 62 deflects the light beam by the reflection section and the adjustment section, and scans the light beam in the y-axis direction on the plane parallel to the regulation surface 11a. It should be noted that a polygon mirror or the like may be used instead of the first and second galvanometer mirrors 61 and 62.

The objective lens 82 is constituted of one or a plurality of lenses. The objective lens 82 is arranged such that an object-side focal position serving as a front focal position falls on a reflection transmission surface 81a of the beam splitter 81 and an image-side focal position serving as a rear focal position falls on the photo-curable resin 1 located on the regulation surface 11a. The objective lens 82 forms an image with the incident light beam that has been scanned in the x- and y-axis directions by the first and second galvanometer mirrors 61 and 62 and has been reflected by the beam splitter 81, on the photo-curable resin 1 located on the regulation surface 11a.

Figure 4:
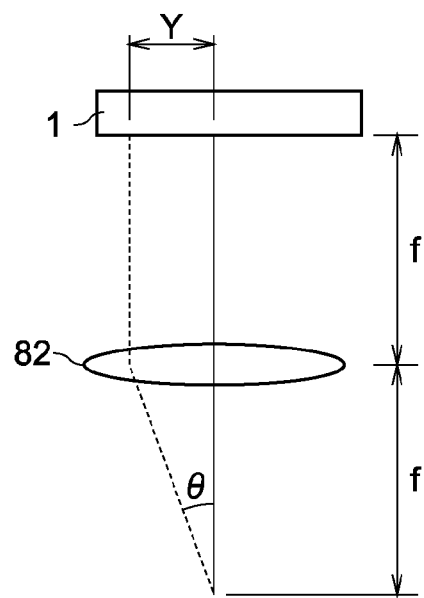
FIG. 4 is a schematic diagram for explaining a function of an objective lens.

FIG. 4 is a schematic diagram for explaining a function of the objective lens 82.

As shown in FIG. 4, an fθ lens having an image height Y proportional to an incident angle θ and a relationship in which a product of a focal length f and the incident angle θ is the image height Y (Y=f×θ) is used for the objective lens 82. By using the fθ lens as the objective lens 82, the light beam that has been scanned in the x-axis direction and the y-axis direction by the first galvanometer mirror 61 and the second galvanometer mirror 62 can be scanned at a uniform speed on the plane parallel to the photo-curable resin 1 located on the regulation surface 11a. Accordingly, it is possible to prevent generation of a difference between a designed shape and an actual shape of a cured layer due to variations of a scanning speed.

The first relay lens 63 is constituted of one or a plurality of lenses and forms an image with the light beam reflected by the first galvanometer mirror 61 on a reflection surface of the second galvanometer mirror 62. The first relay lens 63 guides the light beam such that the light beam that has been deflected by the first galvanometer mirror 61 and thereafter passes through the second galvanometer mirror 62 and the second relay lens 64 passes through the object-side focal position of the objective lens 82 (center of reflection transmission surface 81a).

The second relay lens 64 is constituted of one or a plurality of lenses and forms an image with the light beam reflected by the second galvanometer mirror 62 on the reflection transmission surface 81a of the beam splitter 81. The second relay lens 64 guides the light beam such that the light beam that has been deflected by the second galvanometer mirror 62 passes through the object-side focal position of the objective lens 82 (center of reflection transmission surface 81a).

The first and second relay lenses 63 and 64 having the function as described above constitute a both-side telecentric optical system.

Figure 5:
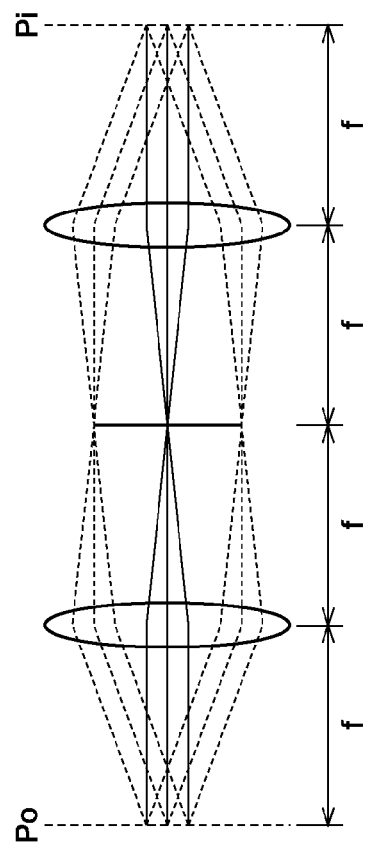
FIG. 5 is a schematic diagram for explaining a both-side telecentric optical system.

FIG. 5 is a schematic diagram for explaining the both-side telecentric optical system.

The optical system shown in FIG. 5 is a typical example of the both-side telecentric optical system, which is called "4f optical system".

For example, an object surface Po corresponding to the first galvanometer mirror 61 or the second galvanometer mirror 62 is set at a front focal position of a lens that is arranged on a foremost side. Further, an image surface Pi corresponding to the second galvanometer mirror 62 or the beam splitter 81 is set at a rear focal position of a lens that is arranged on a rearmost side. In this case, when the light beam that is collected at an arbitrary position on the object surface Po is dispersed and entered, the light beam is converged at a corresponding position on the image surface Pi side. Moreover, the light beam entered as parallel light from the arbitrary position on the object surface Po is entered as parallel light at the corresponding position on the image surface Pi side. As described above, the both-side telecentric optical system emits the parallel light that has been entered from the object surface side at a predetermined position in a predetermined direction, to a corresponding position on the image surface side in a corresponding direction.

Next, the collective exposure optical system 70 will be described.

The collective exposure optical system 70 includes a second light source 71, a reflective-type spatial light modulation section 72, a first focusing lens 73, a beam integrator 74, a reflection section 75, a second focusing lens 76, and a shutter 77.

For example, a blue LED (Light Emitting Diode) with high power is used for the second light source 71.

The beam integrator 74 uniforms light radiated from the second light source 71. As the beam integrator 74, a fly-eye lens, a light rod lens, and the like may be used.

The shutter 77 is provided between the second light source 71 and the beam integrator 74. The shutter 77 controls pass and shielding of the light irradiated to the photo-curable resin 1. Specifically, the shutter 77 controls on/off of exposure by the collective exposure optical system 70.

The reflection section 75 is constituted of a mirror, for example, and reflects the light from the beam integrator 74 and guides it to the beam splitter 81 side.

The first focusing lens 73 is provided between the reflection section 75 and the beam splitter 81 and collects the incident light on the reflection transmission surface 81a of the beam splitter 81.

The beam splitter 81 guides the light that has been radiated from the second light source 71 and entered via the beam integrator 74, the reflection section 75, and the first focusing lens 73, to the second focusing lens 76 and spatial light modulation section 72 side. Further, the beam splitter 81 combines the light subjected to spatial modulation by the spatial light modulation section 72 with the light beam scanned by the scanning section 52 described above, and guides the combined light to the photo-curable resin 1 located on the regulation surface 11a.

As the beam splitter 81, for example, such a polarizing beam splitter that has a reflection transmission surface 81a substantially passing through P polarization components and substantially reflecting S polarization components is used.

The light that is radiated from the second light source 71 and entered to the beam splitter 81 via the beam integrator 74, the reflection section 75, and the first focusing lens 73 is assumed to be S polarization components. The light of the S polarization components is reflected by the beam splitter 81 to be entered to the spatial light modulation section 72.

In order to enter light of predetermined polarizing light to the beam splitter 81 and the spatial light modulation section 72, it may be structured so that a predetermined polarizing plate is provided in an optical path between the second light source 71 and the first focusing lens 73.

For example, a reflective-type liquid crystal device 78 including a transparent substrate and a drive circuit substrate that are opposed to each other and a liquid crystal layer formed of liquid crystal that is sealed in between the transparent substrate and the drive circuit substrate is used as the spatial light modulation section 72. The reflective-type liquid crystal device 78 changes alignment of molecules of the liquid crystal in accordance with an image to be projected, based on a drive signal for each pixel of a reflection pixel electrode that is provided on a main surface of the drive circuit substrate, to thereby change a polarization state of light to be reflected.

The light incident on the reflective-type liquid crystal device 78 is entered from a direction substantially orthogonal to the transparent substrate. The light incident on the reflective-type liquid crystal device 78 is modulated at the polarizing surface based on the drive signal, subjected to intensity modulation by the P polarization components passing through the beam splitter 81 after passing through the second focusing lens 76, and irradiated to the photo-curable resin 1 located on the regulation surface 11a via the objective lens 82.

The number of pixels of the reflective-type liquid crystal device 78 is, for example, a million formed from a 1,000 by 1,000 matrix of pixels.

It has been described that the reflective-type liquid crystal device 78 is used as the spatial light modulation section 72, but the spatial light modulation section 72 is not limited thereto. For example, as the spatial light modulation section 72, a digital mirror micro-device formed by aligning a plurality of minute reflection mirrors whose tilt angles are changed may be used.

The second focusing lens 76 is provided between the spatial light modulation section 72 and the beam splitter 81, and collects light that has been subjected to spatial light modulation by the spatial light modulation section 72 at a front focal position of the objective lens 82. The second focusing lens 76 functions as a projection optical system together with the objective lens 82, the projection optical system forming an image with the light modulated by the spatial light modulation section 72 on the photo-curable resin 1 located on the regulation surface 11a. Further, the second focusing lens 76 is constituted of a lens group that corrects distortion caused when the light subjected to spatial light modulation by the spatial light modulation section 72 passes through the objective lens 82, and can reduce distortion at a maximum.

(Description on Operation)

Next, an operation of the optical shaping apparatus 100 will be described.

(Operation in Case where n-th Cured Layer is Formed)

First, an operation in a case where an n-th cured layer is formed by the optical system 40 including the beam scanning optical system 50 and the collective exposure optical system 70 will be described.

Figure 6:
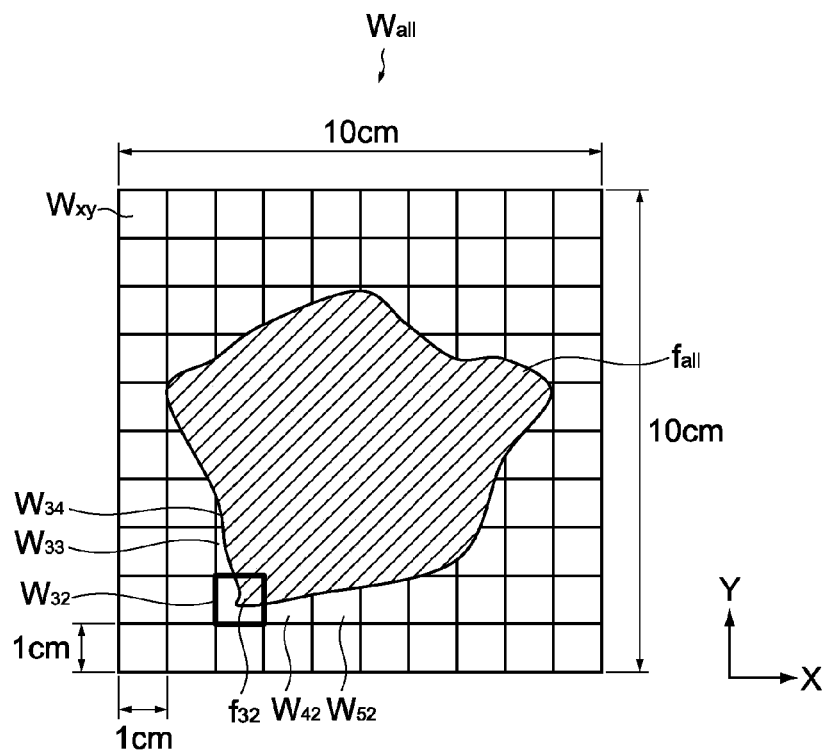
FIG. 6 is a diagram for explaining an operation in a case where an n-th cured layer is formed by the optical system, and is a plan view showing an entire work area Wall and an entire target area fall (n-th cured layer)

FIG. 6 is a diagram for explaining the operation, and is a plan view showing an entire work area $W_{all}$ and an entire target area $f_{all}$ (n-th cured layer).

As shown in FIG. 6, the size of the entire work area $W_{all}$ is 10 cm×10 cm, for example. The size of the entire work area $W_{all}$ (10 cm×10 cm) can be changed as appropriate by changing a movement range of the shaping base 20 moved by the movement mechanism 30 in the horizontal directions (x- and y-axis directions).

The entire target area $f_{all}$ is a predetermined area within the entire work area $W_{all}$ and corresponds to an n-th cured layer. In FIG. 6, a case where the entire target area $f_{all}$ is located at the center of the entire work area $W_{all}$ described as an example, but the entire target area $f_{all}$ is different for each shape of a cured layer or a three-dimensionally shaped object 2.

The entire work area $W_{all}$ is sectioned into small areas of 1 cm×1 cm (hereinafter, referred to as small work area $W_{xy}$, for example. The size of the small work area $W_{xy}$ (1 cm×1 cm) can be changed as appropriate by changing the structure of the second focusing lens 76 and the objective lens 82. It should be noted that a target area within the small work area $W_{xy}$ is hereinafter referred to as small target area $f_{xy}$.

Figure 7:
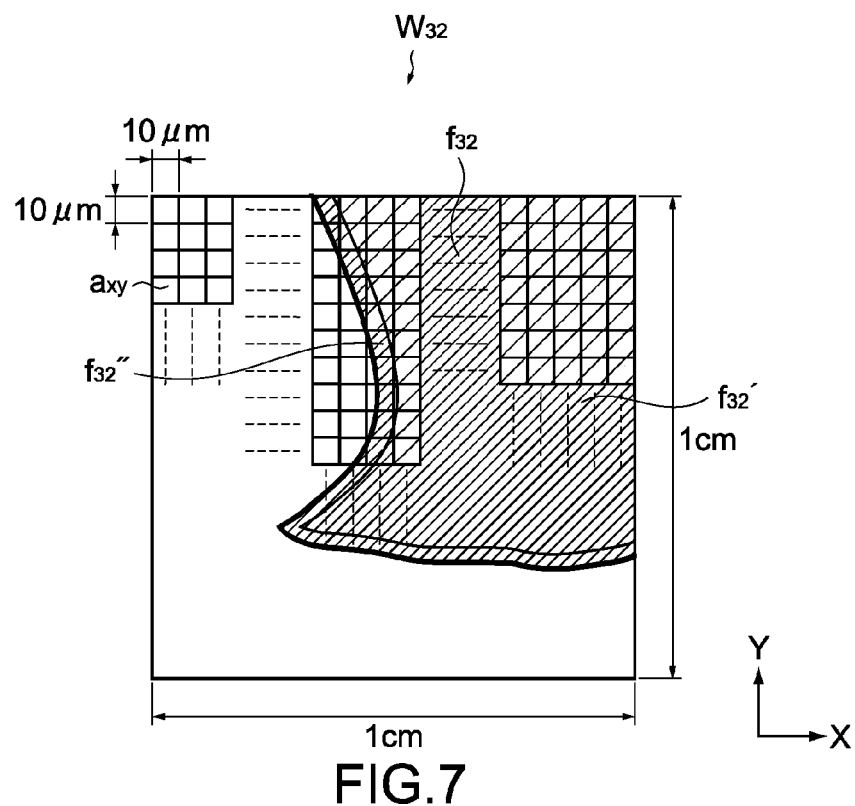
FIG. 7 is an enlarged diagram showing a small work area W32 and a small target area f32.

FIG. 7 is an enlarged diagram showing a small work area $W_{32}$ and a small target area $f_{32}$.

As shown in FIG. 7, the small work area $W_{xy}$ is sectioned into minute areas $a_{xy}$ having a size of about 10 μm×10 μm. The minute area $a_{xy}$ is an area corresponding to one pixel of the reflective-type liquid crystal device 78 constituted of million pixels (1,000×1,000). The size of the minute area $a_{xy}$ (10 μm×10 μm) can be changed as appropriate by changing the number of pixels of the reflective-type liquid crystal device 78.

As shown in FIG. 7, in a case where the small target area $f_{32}$ is located within the small work area $W_{32}$, the optical shaping apparatus 100 collectively draws (collectively exposes with light) an area $f_{32}'$ that occupies a large area of the small target area $f_{32}$ (hereinafter, referred to as collective drawing area $f_{32}'$) by the collective exposure optical system 70. Specifically, the optical shaping apparatus 100 roughly draws the collective drawing area $f_{32}'$ by the light subjected to the spatial modulation by the spatial light modulation section 72 of the collective exposure optical system 70. In this case, the rough drawing is performed by the collective exposure optical system 70 in an order of about 10 μm.

Further, the optical shaping apparatus 100 performs fine drawing on an area $f_{32}''$ in the vicinity of a boundary portion of the small target area $f_{32}$ (hereinafter, referred to as fine drawing area $f_{32}''$) by using the light beam scanned by the scanning section 52 of the beam scanning optical system 50. In this case, the fine drawing is performed by the beam scanning optical system 50 in an order of about 1 μm.

The fine drawing performed by the beam scanning optical system 50 may be executed by performing vector scan on the fine drawing area $f_{32}''$ or may be executed by performing raster scan on the fine drawing area $f_{32}''$. Alternatively, the fine drawing may be performed by a combination of the vector scan and the raster scan.

When the photo-curable resin 1 of the small target area $f_{32}$ is cured in the small work area $W_{32}$, the optical shaping apparatus 100 moves the shaping base 20 by the movement mechanism 30 in the x-axis direction or the y-axis direction. Then, the optical shaping apparatus 100 cures a photo-curable resin 1 of a small target area $f_{xy}$ in a next small work area $W_{xy}$. By repeating the operations, the n-th cured layer is formed.

It should be noted that the optical shaping apparatus 100 may horizontally moves the optical system 40 by the movement mechanism 30 without moving the shaping base 20 in the horizontal directions (x-axis direction and the y-axis direction).

Since the optical system 40 of the optical shaping apparatus 100 according to this embodiment includes the beam scanning optical system 50 and the collective exposure optical system 70, the cured layer can be formed with high accuracy at high-speed. In addition, since the optical shaping apparatus 100 moves the shaping base 20 by the movement mechanism 30 in the horizontal directions and a single-layer cured layer is formed by forming a cured layer for each small work area $W_{xy}$, it is possible to form a cured layer of a large cross section highly accurately at high-speed.

(Operation in Case where Shaping Base is Moved Upwardly)

Next, an operation in a case where the n-th cured layer is formed by the optical system 40 and the shaping base 20 is moved upwardly (in z-axis direction) by the movement mechanism 30 in order to form a next (n+1)-th cured layer will be described.

FIG. 8 are diagrams for explaining an operation at a time when the shaping base 20 is moved upwardly.

Figure 8A:
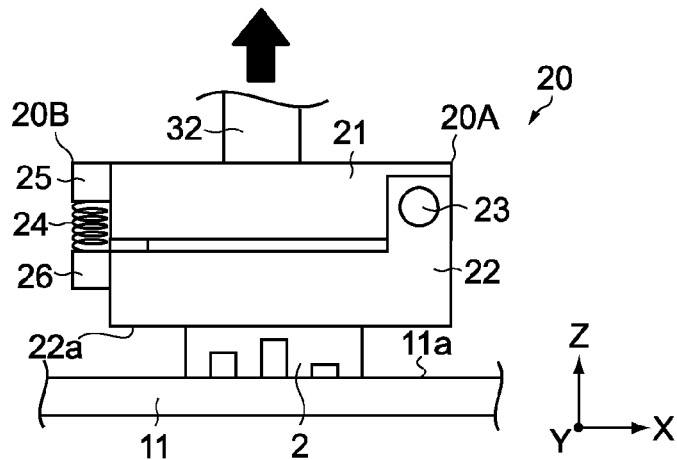
FIG. 8 are diagrams for explaining an operation at a time when the shaping base is moved upwardly.

As shown FIG. 8A, light is irradiated to the photo-curable resin 1 located on the regulation surface 11a by the optical system 40, thus forming an n-th cured layer. Thus, a three-dimensionally shaped object 2 having a first to the n-th cured layers is formed on the support surface 22a of the shaping plate 22.

Figure 8B:
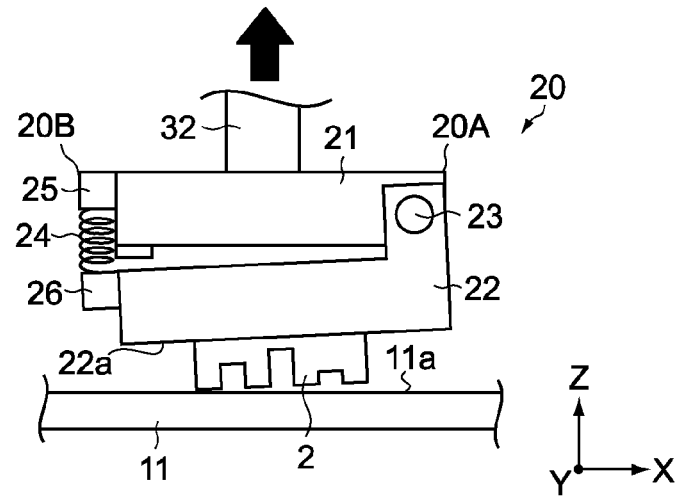

After the n-th cured layer is formed, the shaping base 20 is moved upwardly by the movement mechanism 30 as shown in FIG. 8B. When the shaping base 20 is moved upwardly, the spring member 24 is extended on the second end portion 20B side, and the shaping plate 22 is rotated about hinge member 23 on the first end portion 20A side with respect to the reference plate 21.

At this time, the support surface 22a is gradually moved away from the regulation surface 11a from the first end portion 20A side to the second end portion 20B side, and on a boundary surface between the n-th cured layer and the regulation surface 11a, a force is applied to the cured layer in an oblique direction with respect to the regulation surface 11a. Accordingly, the n-th cured layer that adheres to the regulation surface 11a can be separated from the regulation surface 11a smoothly. As a result, it is possible to prevent the cured layer from being damaged and form the three-dimensionally shaped object 2 with high accuracy. In addition, it is also possible to prevent the three-dimensionally shaped object 2 from being separated from the support surface 22a.

Figure 8C:
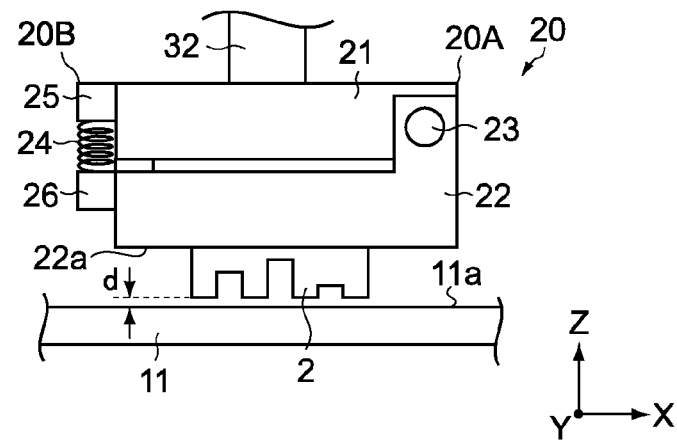

When the n-th cured layer (three-dimensionally shaped object 2) is separated from the regulation surface 11a, the shaping plate 22 is attracted to the reference plate 21 side by the spring member 24 and thus the support surface 22a becomes parallel to the regulation surface 11a as shown in FIG. 8C.

A distance d between a lower surface of the three-dimensionally shaped object 2 and the regulation surface 11a, that is, a distance d by which the shaping base 20 is moved upwardly by the movement mechanism 30, in a state where the support surface 22a of the shaping plate 22 is parallel to the regulation surface 11a, is set to be a range from 10 μm to 100 μm, for example. The distance d between the lower surface of the three-dimensionally shaped object 2 and the regulation surface 11a (10 μm to 100 μm) corresponds to a thickness of one cured layer.

After upwardly moving the shaping base 20 by the movement mechanism 30, the optical shaping apparatus 100 irradiates light to the photo-curable resin 1 located on the regulation surface 11a again by the optical system 40 and forms an (n+1)-th cured layer. The operations are repeated and thus the three-dimensionally shaped object 2 of a desired shape is formed.

As described above, according to the shaping base 20 of the optical shaping apparatus 100 of this embodiment, it is possible to prevent the cured layer from being damaged, with the result that a three-dimensionally shaped object 2 with high accuracy can be formed. Moreover, the shaping base 20 of the optical shaping apparatus 100 according to this embodiment has an extremely simple structure, which is also advantageous in terms of costs.

In addition, the spring member 24 attracts the reference plate 21 and the shaping plate 22 by a force larger than resin contraction caused when the cured layer is formed, as described above. Accordingly, it is possible to prevent the shaping plate 22 from being moved downwardly (on regulation surface 11a side) by the resin contraction caused when the cured layer is formed.

Incidentally, since the optical system 40 of the optical shaping apparatus 100 according to this embodiment includes the beam scanning optical system 50 and the collective exposure optical system 70 as described above, a cured layer can be formed highly accurately. Accordingly, the optical shaping apparatus 100 according to this embodiment can upwardly move the cured layer that is highly accurately formed by the optical system 40, without damaging the cured layer by the shaping base 20, with the result that an extremely accurate three-dimensionally shaped object 2 can be formed.

Further, in the optical shaping apparatus 100 according to this embodiment, as described above, the shaping base 20 is moved by the movement mechanism 30 horizontally, and a cured layer is formed for each small work area Wxy to thus form a single-layer cured layer. As a result, a cured layer of a large cross section can be formed with high accuracy. In a case where a cured layer of a large cross section is formed in this way, it is highly possible that a cured layer adheres to the regulation surface 11a and is damaged if the shaping base 20 is moved upwardly while the support surface 22a is parallel to the regulation surface 11a. In other words, in a case where a cured layer of a large cross section is formed, the cured layer needs to be peeled from the regulation surface 11a by a relatively large force, and accordingly the cured layer may be damaged. On the other hand, the shaping base 20 of the optical shaping apparatus 100 according to this embodiment can apply a force to the cured layer in an oblique direction with respect to the regulation surface 11a, with the result that the cured layer can be separated from the regulation surface 11a smoothly even when the cured layer has a large cross section. Consequently, the optical shaping apparatus 100 according to this embodiment can also form a three-dimensionally shaped object 2 having a large cross section highly accurately.

Second Embodiment

Next, a second embodiment of the present application will be described.

The second embodiment is different from the above first embodiment in that a lock mechanism is provided to the shaping base. Accordingly, that point will be mainly described. It should be noted that in descriptions on the second embodiment and subsequent descriptions, members or the like having the same structures and functions as those of the optical shaping apparatus according to the first embodiment described above are denoted by the same reference symbols, and descriptions thereof are omitted or simplified.

Figure 9:
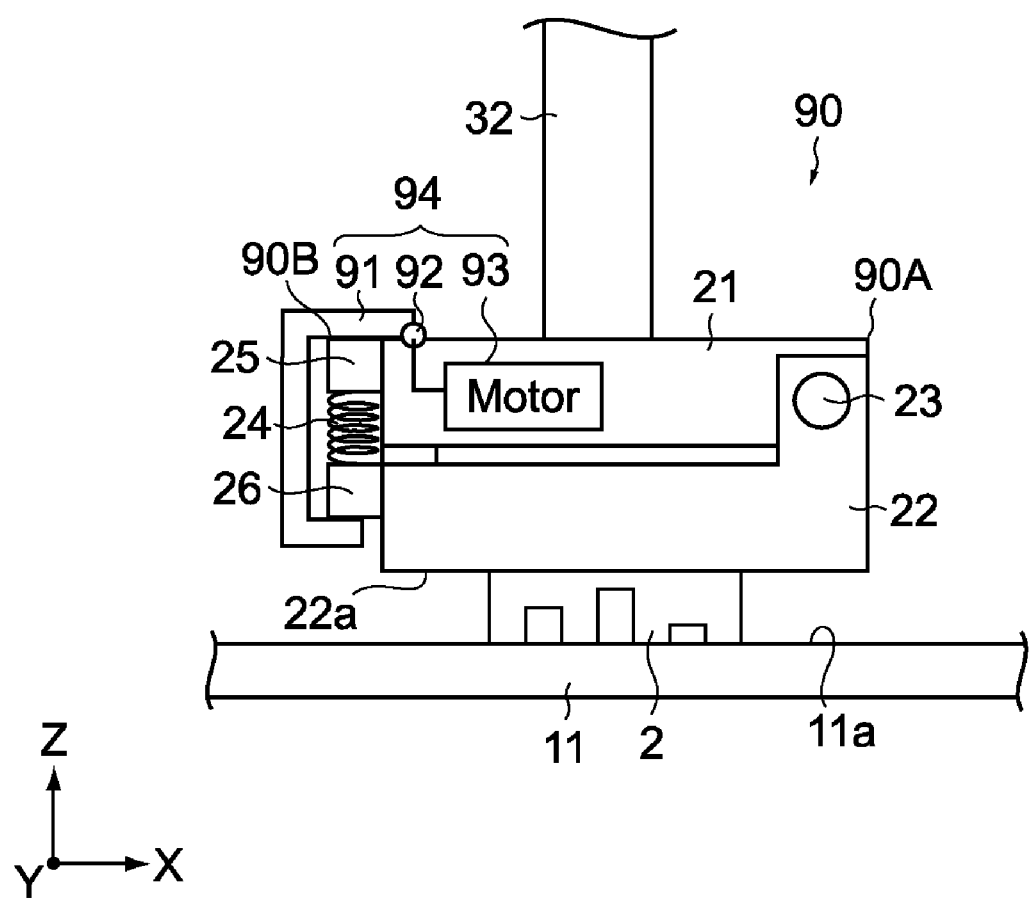
FIG. 9 is an enlarged diagram showing a shaping base included in an optical shaping apparatus according to another embodiment.

FIG. 9 is an enlarged diagram showing a shaping base 90 included in an optical shaping apparatus 100 according to this embodiment.

The shaping base 90 according to this embodiment includes the reference plate 21 including the spring support portion 25, the shaping plate 22 including the spring support portion 26, the spring support portions 25 and 26 being provided on a second end portion 90B side, and the hinge member 23 that rotatably supports the reference plate 21 and the shaping plate 22 on a first end portion 90A side. Further, the shaping base 90 includes the spring member 24 that is coupled to the spring support portions 25 and 26 and attracts the reference plate 21 and the shaping plate 22 by a predetermined force on the second end portion 90B side.

In addition, the shaping base 90 includes a lock mechanism 94 for fixing the reference plate 21 and the shaping plate 22 in a state where the reference plate 21 and the shaping plate 22 are attracted by the spring member 24.

The lock mechanism 94 is arranged on the second end portion 90B side of the shaping base 90, for example. The lock mechanism 94 may be positioned at the center of the shaping base 90 or may be on the first end portion 90A side of the shaping base 90.

The lock mechanism 94 includes a lock member 91 for fixing the reference plate 21 and the shaping plate 22, an axis 92 for rotatably supporting the lock member 91, the axis 92 being provided on an upper portion of the reference plate 21, and a motor 93 for rotatably driving the axis 92.

The lock member 91 fixes a positional relationship between the reference plate 21 and the shaping plate 22 by sandwiching and fixing the spring support portion 25 and the spring support portion 26. The lock member 91 is made of metal, a resin, or the like, but a material thereof is not particularly limited.

The motor 93 is electrically connected to a control section of the optical shaping apparatus 100. The motor 93 rotates the lock member 91 by rotatably driving the axis 92 under control of the control section, and switches between a locked state and an unlocked state of the reference plate 21 and the shaping plate 22 due to the lock member 91.

Subsequently, an operation in a case where the shaping base 90 is moved upwardly by the movement mechanism 30 will be described.

FIG. 10 are diagrams for explaining the operation.

Figure 10A:
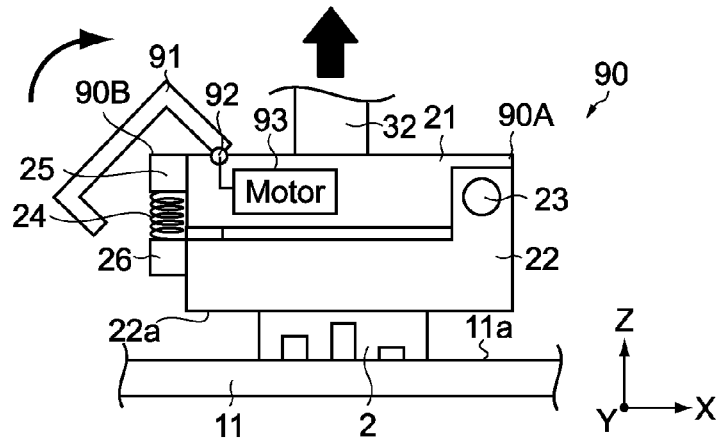
FIG. 10 are diagrams for explaining an operation at a time when the shaping base is moved upwardly.

As shown in FIG. 10A, when light is irradiated to the photo-curable resin 1 located on the regulation surface 11a by the optical system 40 and an n-th cured layer is formed, the axis 92 is rotated by the drive of the motor 93 and thus the lock member 91 is rotated. Accordingly, the locked state of the reference plate 21 and the shaping plate 22 by the lock member 91 is canceled.

Figure 10B:
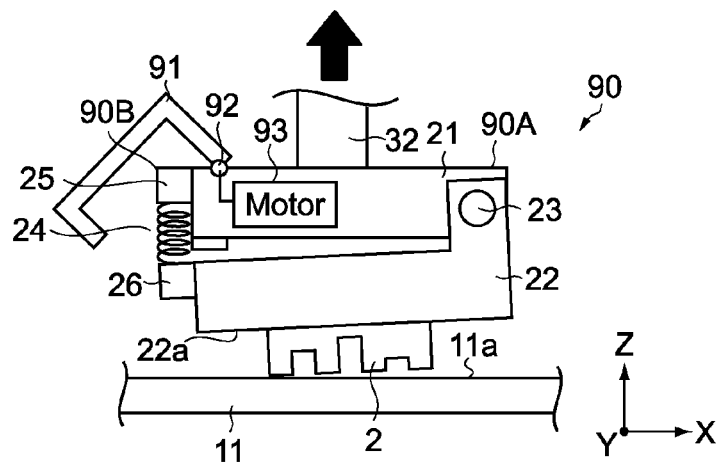

When the locked state is canceled, the shaping base 90 is moved upwardly by the movement mechanism 30 as shown in FIG. 10B. When the shaping base 90 is moved upwardly, the shaping plate 22 is rotated with respect to the reference plate 21 via the hinge member 23 on the first end portion 90A side.

At this time, on a boundary surface between the n-th cured layer and the regulation surface 11a, a force is applied to the cured layer in an oblique direction with respect to the regulation surface 11a. Accordingly, the n-th cured layer that adheres to the regulation surface 11a can be separated from the regulation surface 11a smoothly.

Figure 10C:
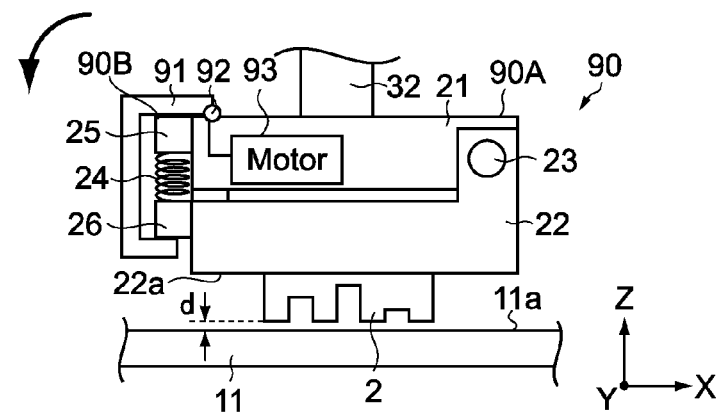

When the n-th cured layer (three-dimensionally shaped object 2) is peeled from the regulation surface 11a, the shaping plate 22 is attracted to the reference plate 21 side by the spring member 24 and thus the support surface 22a becomes parallel to the regulation surface 11a as shown in FIG. 10C.

When the support surface 22a of the shaping plate 22 is parallel to the regulation surface 11a, the axis 92 is rotated by the drive of the motor 93 in a direction opposite to that in the above operation, and the lock member 91 is rotated in a direction opposite to that in the above operation. Accordingly, the reference plate 21 and the shaping plate 22 are locked by the lock member 91.

When the reference plate 21 and the shaping plate 22 are locked, the optical system 40 irradiates light to the photo-curable resin 1 located on the regulation surface 11a to thereby form an (n+1)-th cured layer. At this time, since the shaping plate 22 is fixed to the reference plate 21, it is possible to prevent the shaping plate 22 from being moved downwardly due to resin contraction of the photo-curable resin 1.

Upon formation of the (n+1)-th cured layer, the locked stated is canceled (see FIG. 10A), and the shaping base 90 is moved upwardly (see FIG. 10B). By repeating the above operations, a three-dimensionally shaped object 2 is formed.

In the shaping base 90 according to the second embodiment, a movement of the shaping base 90 in the downward direction due to the resin contraction is prevented by the lock mechanism 94, with the result that a highly accurate three-dimensionally shaped object 2 is formed.

It should be noted that the spring member 24 of the shaping base 90 according to the second embodiment may not attract the reference plate 21 and the shaping plate 22 by a force larger than a force caused by the resin contraction. In other words, in this embodiment, since the downward movement of the shaping plate 22 due to the resin contraction is prevented by the lock mechanism 94, the spring member 24 may not attract the reference plate 21 and the shaping plate 22 by the force larger than the resin contraction.

In the description of the second embodiment, the lock mechanism 94 has been constituted of the lock member 91, the axis 92, and the motor 93. However, the structure of the lock mechanism 94 is not limited to the above.

The lock mechanism 94 may have any structure as long as the locked state and the unlocked stated of the reference plate 21 and the shaping plate 22 can be switched.

Various Modified Examples

In the above embodiments of the present application, there has been described that the optical system 40 includes the beam scanning optical system 50 and the collective exposure optical system 70, but the optical system 40 is not limited thereto. An optical system 40 generally used may be used. For example, an optical system 40 of a transmissive-type SLM (Spatial light Modulator) projection system or an optical system 40 of a beam scanning system in which a galvanometer mirror and the like are used may be used. As described above, even when a generally-used optical system 40 is employed, it is possible to prevent a cured layer (three-dimensionally shaped object) from being damaged by the shaping base 20, with the result that a three-dimensionally shaped object 2 with high accuracy can be formed.

Further, the above embodiments have described that the entire work area $W_{all}$ is sectioned into the small work areas $W_{xy}$, and a cured layer is formed for each small work area $W_{xy}$, thus forming a single-layer cured layer. However, the present application is not limited to the above, and a single-layer cured layer may be formed by the optical system 40 at a time. In this case, the entire work area $W_{all}$ may not be sectioned into the small work areas $W_{xy}$.

A resin layer formed into a thin film may be formed on the support surface 22a of the shaping plate 22 in advance. The resin layer is made of, for example, a photo-curable resin such as a UV curable resin. The resin layer is formed by, after a liquid photo-curable resin is spin-coated onto the support surface 22a, irradiating light to the photo-curable resin to be cured. In this case, a first cured layer constituting a three-dimensionally shaped object 2 is formed on the resin layer on the support surface 22a.

The photo-curable resin used for the resin layer may be the same material as the photo-curable resin 1 used for forming the three-dimensionally shaped object 2. Further, in this case, the shaping plate 22 may be formed of a resin such as an acrylic resin.

With this structure, adhesion of the shaping plate 22 and the three-dimensionally shaped object 2 can be increased, with the result that it is possible to prevent the three-dimensionally shaped object 2 from being peeled from the support surface 22a when the shaping base 20 (or shaping base 90) is moved upwardly. Accordingly, the three-dimensionally shaped object 2 with higher accuracy can be formed.

It should be understood that various changes and modifications to the presently preferred embodiments described herein will be apparent to those skilled in the art. Such changes and modifications can be made without departing from the spirit and scope and without diminishing its intended advantages. It is therefore intended that such changes and modifications be covered by the appended claims.

The application is claimed as follows:

1. An optical shaping apparatus, comprising:
    a light transmissive member that includes a regulation surface to regulate a liquid level of a photo-curable resin, and causes light used for curing the photo-curable resin to pass therethrough;
    a shaping base that includes a first end portion, and a second end portion, the shaping base including a first member and a second member that includes a support surface and is rotatably coupled with a hinge member to the first member on the first end portion side, the support surface being opposed to the regulation surface and being operable to support a three-dimensionally shaped object that is formed by laminating the photo-curable resins cured by the light in a stepwise manner, the second end portion being on an opposite side of the first end portion, said shaping base including an elastic member to couple the first member and the second member on the second end portion side; and
    a movement mechanism to move the shaping base in a direction away from the light transmissive member so that the support surface is gradually moved away from the regulation surface from the first end portion side to the second end portion side.

2. The optical shaping apparatus according to claim 1,
    wherein the elastic member has a strength to attract the first member and the second member by a force larger than a force by which the support surface is attracted to the regulation surface side due to contraction caused when the photo-curable resin is cured.

3. The optical shaping apparatus according to claim 1, further comprising
    a lock mechanism to fix the first member and the second member in a state where the first member and the second member are attracted to each other.

4. The optical shaping apparatus according to claim 1,
    wherein the shaping base further includes a resin layer formed into a thin film on the support surface.

* * * * *